J. ROGERS.
Harrow.

No. 222,312. Patented Dec. 2, 1879.

WITNESSES:
Chas. Nieta
C. Sedgwick

INVENTOR:
J. Rogers
BY Munn & Co
ATTORNEYS.

UNITED STATES PATENT OFFICE.

JOHN ROGERS, OF ELDRIDGE, IOWA.

IMPROVEMENT IN HARROWS.

Specification forming part of Letters Patent No. 222,312, dated December 2, 1879; application filed July 8, 1879.

*To all whom it may concern:*

Be it known that I, JOHN ROGERS, of Eldridge, in the county of Scott and State of Iowa, have invented a new and useful Improvement in Harrows, of which the following is a specification.

The object of my invention is to provide for shifting the inclination of harrow-teeth at will backward or forward, so that the depth to which the teeth act on the soil may be regulated by inclining them forward more or less, and that by reversing them the inclination of the teeth will free them from rubbish.

My invention consists in a harrow the frame of which is made in two parts, an upper and a lower, connected together and fitted to move lengthwise upon each other. The teeth are pivoted upon the upper frame, and pass through apertures in the under frame, so that the inclination of the teeth is dependent upon the relative position of the two parts of the harrow.

Similar letters of reference indicate corresponding parts.

Figure 1:
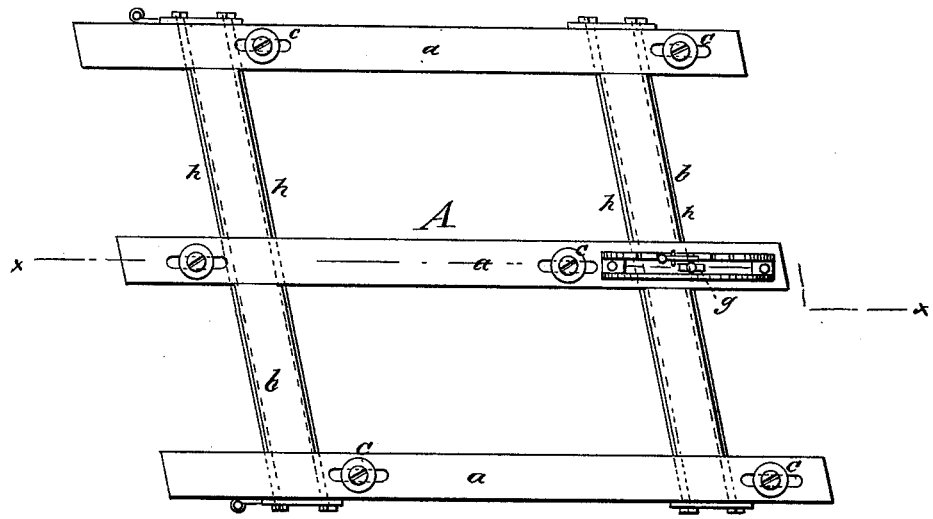
Figure 2:
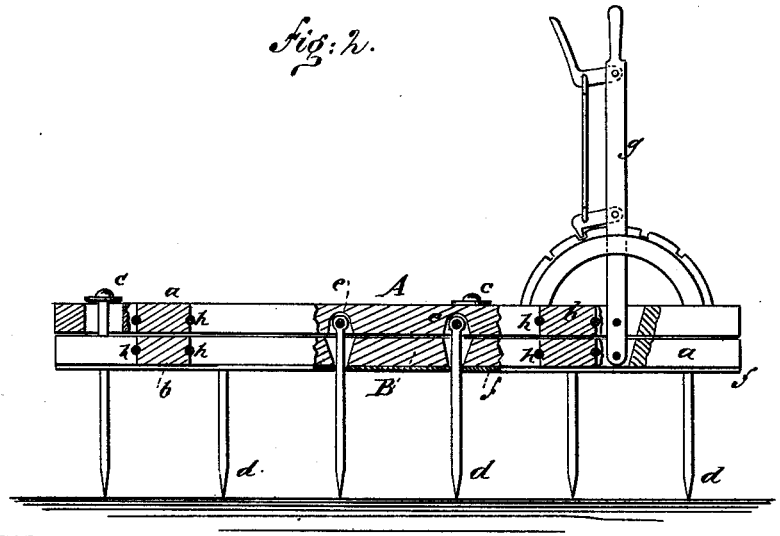

The improved harrow is shown in the accompanying drawings, wherein Figure 1 is a plan view. Fig. 2 is a sectional elevation on line $x\ x$ of Fig. 1.

A is the upper frame of the harrow and B the under frame, which frames are similar in construction, and each consists of longitudinal bars $a$ and cross-bars $b$. These frames are connected together by headed screws or pins $c$, which project from the upper side of the frame B through slots in frame A, with their heads bearing on the upper side of A, so that, while the parts are thus securely connected, the frames may slide one upon the other, lengthwise of the harrow, as far as permitted by the slots.

The teeth $d$ are formed at their upper ends with loops or eyes $e$, which enter recesses in the side bars, $a$, of frame A, and are attached by cross-pins passing through the eyes and bars.

The under frame, B, is apertured for the teeth to pass through, and the bars $a$ of frame B are fitted with metal plates $f$ at their under side, which plates have apertures just large enough for the teeth to pass, so that the teeth bear against the sides of the apertures and the plate takes the wear.

At the back of the harrow is a lever, $g$, attached to both frames A B, and working in connection with a notched segment and detent, whereby the frames may be moved upon each other in contrary directions, and held in place when moved. This construction permits the teeth to be set vertically, or more or less inclined forward, so that they will enter the ground to the desired depth. The teeth may also be thrown back to free them from cornstalks or other rubbish.

Instead of attaching the cross-bars $b$ to side bars, $a$, by mortise and tenon, the bars $b$ consist of short pieces placed between the bars $a$ and retained in place by cross-rods $h$, that extend through the bars $a$ and through grooves at the sides of bars $b$. There are two of these rods $h$ applied in connection with each bar $b$, one at each side, and they are provided with nuts and washers at their outer ends, so that the frames can be drawn together and held securely.

This manner of connecting the frame is cheaper and stronger than mortise-and-tenon joints, and permits ready disconnection.

I do not limit myself to the specified means for connecting the two parts of the harrow together, as any suitable devices—as, for instance, staples—may be used in place of the pins.

Having thus fully described my invention, I claim as new and desire to secure by Letters Patent—

The frames A B, one movable longitudinally on the other, and the harrow-teeth, pivoted to the upper and passing through the lower frame, in combination with the lever $g$, slotted bars $a$, and pins $c$, substantially as set forth.

JOHN ROGERS.

Witnesses:
J. D. McCORMICK,
J. A. POLLOCK.